United States Patent [19]
Helbach et al.

[11] Patent Number: 5,271,706
[45] Date of Patent: Dec. 21, 1993

[54] SELF-LOADING PAPER TRANSPORT SYSTEM

[75] Inventors: David J. Helbach, Amherst; Ronald Zyduck, Mosines; Perry J. Jewell, Stevens Point, all of Wis.

[73] Assignee: HKM Corporation, Plover, Wis.

[21] Appl. No.: 786,800

[22] Filed: Oct. 31, 1991

[51] Int. Cl.$^5$ .................................................. B65G 7/06
[52] U.S. Cl. .................................................. 414/676; 198/746; 271/157; 414/352; 414/523; 414/751; 414/903
[58] Field of Search .................................. 198/746; 271/157; 414/676, 795.8, 751, 903, 786, 275, 277, 279, 352, 523

[56] References Cited

U.S. PATENT DOCUMENTS

| | | | |
|---|---|---|---|
| 2,854,150 | 9/1958 | Shea, Jr. | |
| 2,984,364 | 5/1961 | Lamb | |
| 3,141,706 | 7/1964 | Curtenius | |
| 3,250,573 | 5/1966 | Clarke et al. | |
| 3,398,844 | 8/1968 | Carlsson et al. | 414/277 |
| 3,429,469 | 2/1969 | Peterson | 414/903 X |
| 3,588,088 | 6/1971 | Reiners et al. | 270/79 |
| 3,645,581 | 2/1972 | Lasch, Jr. et al. | 302/2 R |
| 4,280,782 | 7/1981 | Stumpf | 414/676 |
| 4,354,796 | 10/1982 | Bergman | 414/676 |
| 4,387,890 | 6/1983 | Lampe | 271/225 |
| 4,609,000 | 9/1986 | Noh et al. | 134/62 |
| 4,714,399 | 12/1987 | Olson | 414/275 X |
| 4,759,677 | 7/1988 | Lukens, Jr. | 414/676 |
| 5,051,058 | 9/1991 | Roth | 414/789 |

FOREIGN PATENT DOCUMENTS

| | | | |
|---|---|---|---|
| 2229814 | 11/1973 | Fed. Rep. of Germany | 271/157 |
| 3716412 | 11/1988 | Fed. Rep. of Germany | 414/903 |
| 308325 | 12/1989 | Japan | 271/157 |

OTHER PUBLICATIONS

Automatan Load Turners, ©1991, Automatan, Incorporated, Plover, Wis.
Photograph A, side view, photograph B, front-side view portable air deck manufactured by Automatan, Incorporated, Plover, Wis.

Primary Examiner—Michael S. Huppert
Assistant Examiner—Janice Krizek
Attorney, Agent, or Firm—Lathrop & Clark

[57] ABSTRACT

A movable cart has an air deck with a gripper assembly mounted thereon which has two opposed gripper arms which may be extended into a jogger/aerator to engage and grip a stack of paper supported on an air deck therein and to withdraw the stack fully onto the cart. The cart is movable between the jogger/aerator and one or more sheet feeding apparatus. Each sheet-feeding apparatus is outfitted with an air deck onto which the loaded sheet stack may be automatically unloaded. A transfer deck has a plurality of swords with spring-loaded dogs for storing a stack of paper and advancing the stored stack into the sheet-feeding apparatus upon exhaustion of its sheet supply.

15 Claims, 6 Drawing Sheets

SELF-LOADING PAPER TRANSPORT SYSTEM

FIELD OF THE INVENTION

The present invention relates to conveying apparatus in general and to apparatus for moving stacks of sheet material between apparatus which perform various operations on the sheets in particular.

BACKGROUND OF THE INVENTION

In the printing industry it is often desirable or necessary to perform a sequence of operations on individual sheets of paper or paperboard. Certain types of paper stock such as high quality coated papers or corrugated cardboard are not susceptible to running as a roll or web and must be treated as a stack of individual sheets.

In a typical operation, a stack of paper sheets which may be four to five feet high and weigh as much as 5,000 pounds will come from a store room or sheet cutter and will be prepared for printing operations on a jogger/aerator. Once jogged and aerated the stack will then be conveyed to a sheet-feeding printing press, laminator, die cutter, embosser, or other apparatus collectively referred to herein as "converting equipment" or "sheet treating apparatus".

Conventional printing presses and converting equipment are often configured to accept stacks of sheet paper. However, it is important that each sheet in the stack be delivered from one operation to the next without wrinkling, crimping, or soiling. Heretofore paper stacks have been transported on wooden or plastic pallets which provide slots for the entrance of forklift tines beneath the pallet to allow the lifting and positioning of the entire stack without coming into direct contact with individual sheets in the stack.

Although pallet transport of stacks avoids damage to the conveyed paper, it does require that prior to loading a subsequent stack onto a press or converting equipment the previous pallet must be extracted, removed and transported to a location for reloading. Furthermore, pallets are costly and must be periodically replaced. As every load in process throughout a plant must have a pallet beneath it at all times, a significant capital investment in pallets will be present in any extensive printing operation.

In some applications pallets have been eliminated by the substitution of paper slip sheets placed beneath the stack with a gripping edge extending beyond the stack which may be gripped to drag the stack from one position to another. Slip sheets, however, are subject to tearing and must also be removed between each loading of a particular machine.

To reduce friction between a paper stack and the surface over which it is conveyed fixed air cushion tables or air decks have been employed for conveying a stack from between operations within a single apparatus utilizing spring-loaded dogs mounted on chain-driven bars. Portable air cushion tables are also known for transporting loaded slips from one operation to another although these machines have typically required manual dragging of the stack from the portable table to other apparatus.

What is needed is an apparatus for automatically conveying a stack of paper between operations which does not require pallets or slip sheets and yet which preserves the integrity of all sheets within the stack.

SUMMARY OF THE INVENTION

The self-loading air deck paper transport system of this invention has a movable cart for the transport of a stack of sheet material from a first air deck to a second air deck. The cart has a frame upon which is mounted a horizontal planar air deck having a plurality of apertures therein for the introduction of air through the deck surface to create an air cushion for the support of a stack of sheet material. A plurality of rotatable wheels are mounted to the frame beneath the deck and run on fixed tracks. The cart has drive chains which are driven by rotatable sprockets on each side of the air deck and side members are connected to the chains to form a subcarriage which is slideable on the air deck. A carriage is mounted on the subcarriage for forward and rearward motion and two opposed gripper arms are mounted on linear bearings extending transverse to the direction of motion of the subcarriage and are movable towards and away from each other to selectively engage with and grip the sides of a stack during the loading and unloading of the cart. The cart is positionable alongside a jogger/aerator outfitted with an air deck such that the subcarriage and gripper arms extend onto the air deck of the jogger/aerator to engage a stack of paper and to load the paper onto the cart air deck. The loaded cart is self-propelled to a position alongside a printer or other converting equipment where the gripper arms and carriage are extendable to position the stack on a second air deck. The cart may be used in conjunction with a fixed transfer air deck aligned with the second air deck. The transfer air deck has a plurality of linear bars with spring-loaded dogs which run in channels formed in the transfer air deck surface which align with channels in the second air deck. The bars are movable to advance a stack placed on the transfer deck onto the second air deck such that the rear dogs on the bars first engage the stack and move it a portion of the distance onto the second air deck then the bars retract until the front dogs are in position to engage the stack and the front dogs then engage the stack and advance it onto the second air deck.

In an alternative embodiment of the invention, the movable cart is provided with extendable bars with spring-loaded dogs for loading a stack of sheet material onto the movable cart. The cart has a chain driven pusher arm for unloading the loaded stack onto the second air deck. An electronic controller provides for automatic operation of the system.

It is an object of the present invention to provide an apparatus for automatically conveying a load of stacked sheet material from a first sheet treating machine to a second sheet treating machine.

It is also an object of the present invention to provide an apparatus which conveys a stack of sheet material which does not require a pallet or slip sheet for manipulation and positioning of the stack.

It is a further object of the present invention to provide a cart which may automatically load and unload a stack of sheet material from its surface.

It is another object of the present invention to provide a staging area apparatus for conveying a stack of sheet material from a movable cart to a fixed sheet treating apparatus.

It is an additional object of the present invention to provide a cart which automatically centers itself with respect to a stack of paper for centered loading of the stack.

It is yet another object of the present invention to provide an apparatus for conveying stacks of paper sheets from a jogger/aerator to a selected one of a plurality of converting equipment devices.

It is a still further object of the present invention to provide a conveying apparatus capable of loading and unloading in substantially undamaged fashion a variety of paper materials including corrugated paperboard.

Further objects, features and advantages of the invention will become apparent from the following detailed description when taken in conjunction with the accompanying drawings.

DESCRIPTION OF THE PREFERRED EMBODIMENT

Figure 1:
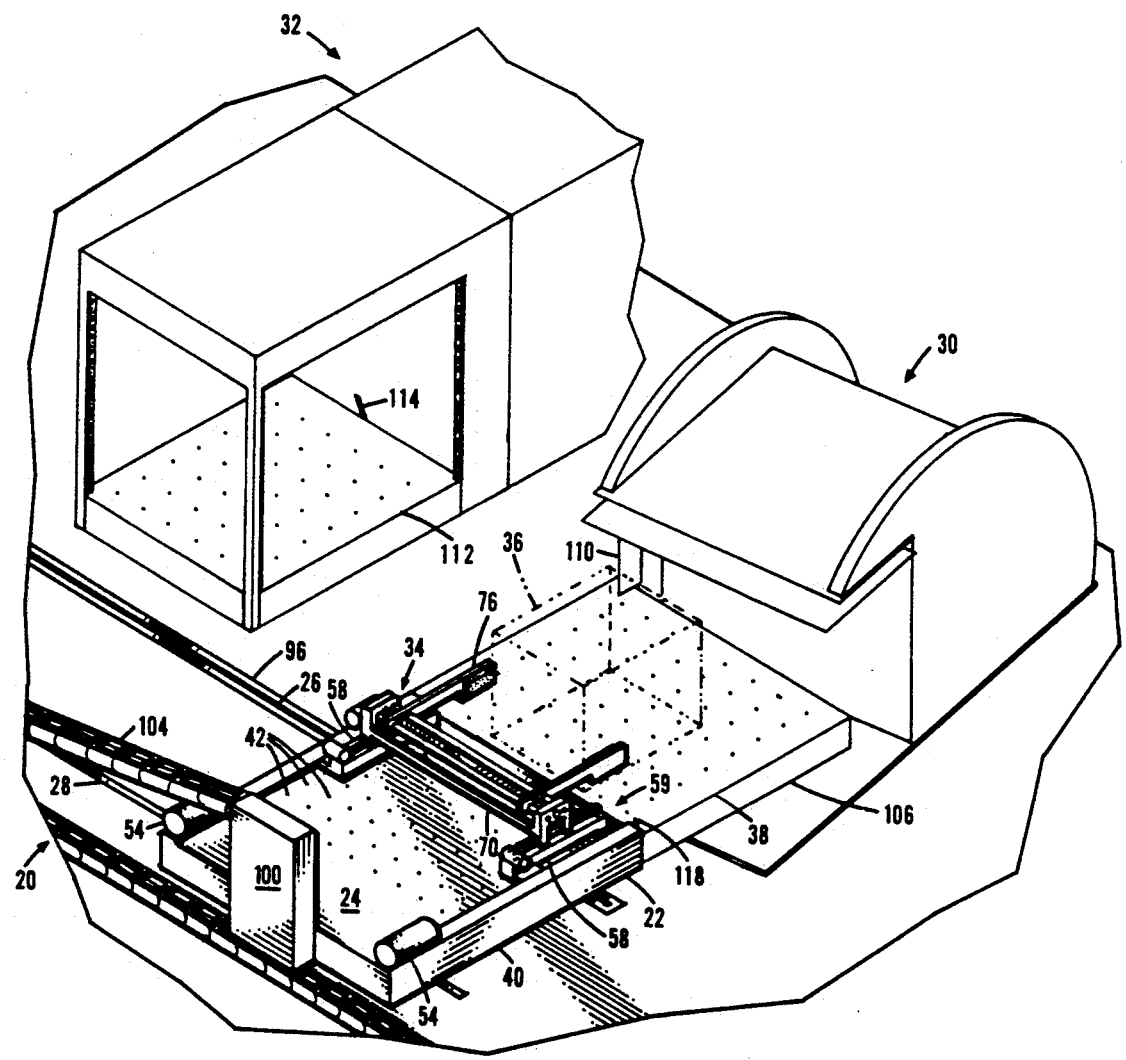
FIG. 1 is an isometric view of the paper transport system of this invention with a transport cart installed between a jogger/aerator and a sheet feeding apparatus.

Referring more particularly to FIGS. 1-13 wherein like numbers refer to similar parts, a self-loading air deck paper transport system 20 is shown in FIG. 1.

The system 20 has a wheeled cart 22 with an air cushion air deck 24 mounted thereon. The cart runs on tracks 26, 28 between a jogger/aerator 30 and a sheet feeding converter here illustrated as a printing press 32. A gripper assembly 34 is mounted above the air deck 24 and operates to engage a paper stack 36 located on the air deck 38 of the jogger/aerator 30 and load the stack onto the cart 22 for transport and unloading unto the printing press 32.

The cart 22 has a rigid frame 40 to which the air deck 24 is mounted. The air deck 24 is of conventional design having an array of apertures 42 through the surface 44 connected by a manifold 46 to a source of compressed air (not shown). Each aperture 42 has a ball valve 48 which permits compressed air to escape through the aperture 42 only when a load is resting on the deck above the particular aperture 42. When a load such as a paper stack 36 is placed on the air deck 24 a number of ball valves 48 are simultaneously depressed allowing compressed air to escape from an array of apertures 42 to form an air cushion beneath the load. This air cushion supports the paper stack and results in a greatly lowered effective coefficient of friction which permits the load to be moved horizontally with a greatly reduced force.

The paper transport system 20 is employed for transporting paper stacks between apparatus which perform operations on individual sheets of paper. For the purposes of this application, paper is defined to mean rag, pulp, or synthetic paper sheets, plastic sheets, paperboard, corrugated cardboard, or other sheet material.

Figure 3:
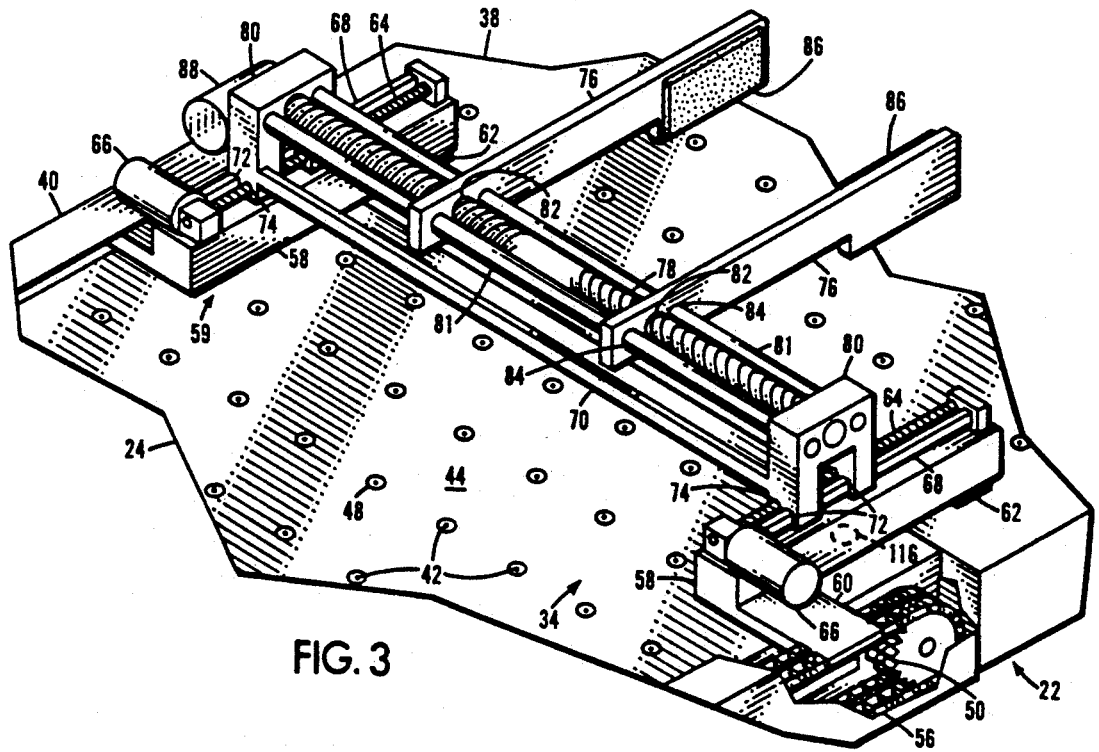
FIG. 3 is an enlarged isometric view of the gripper assembly of the transport cart of FIG. 1.
Figure 4:
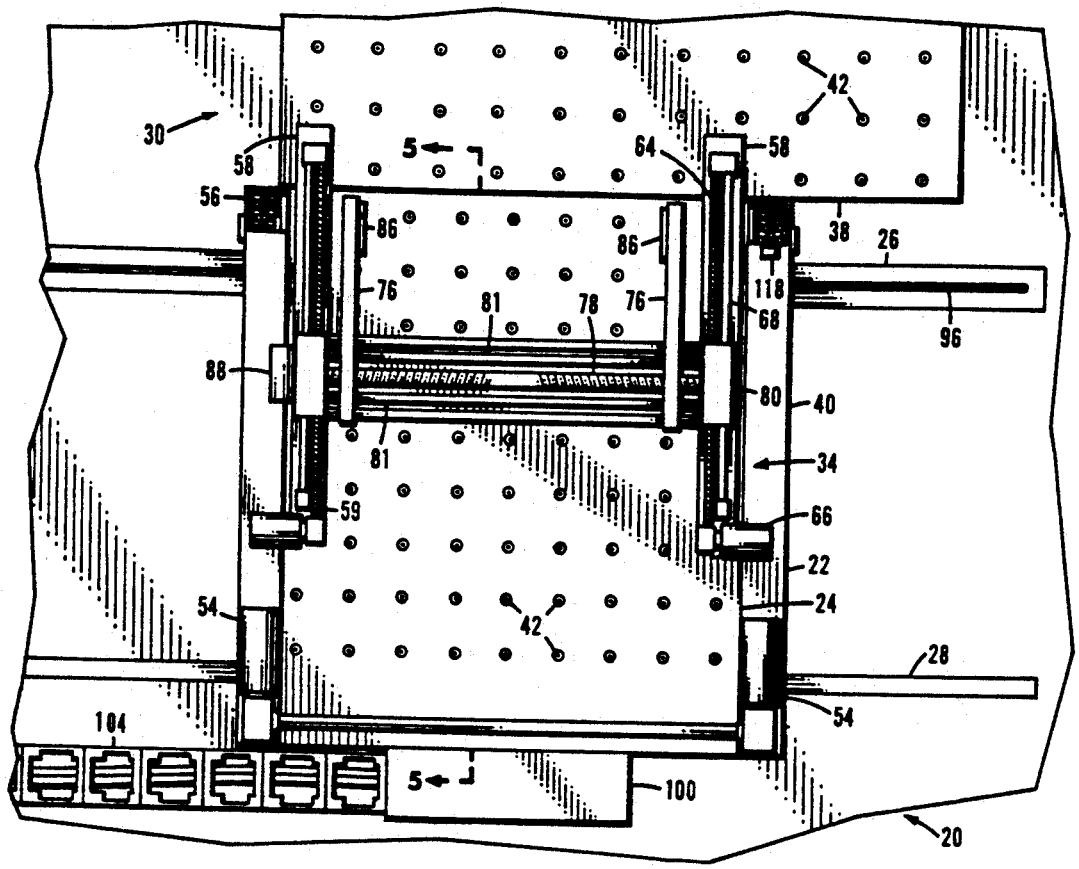
FIG. 4 is a top plan view of the cart and aerator/jogger of FIG. 1.
Figure 5:
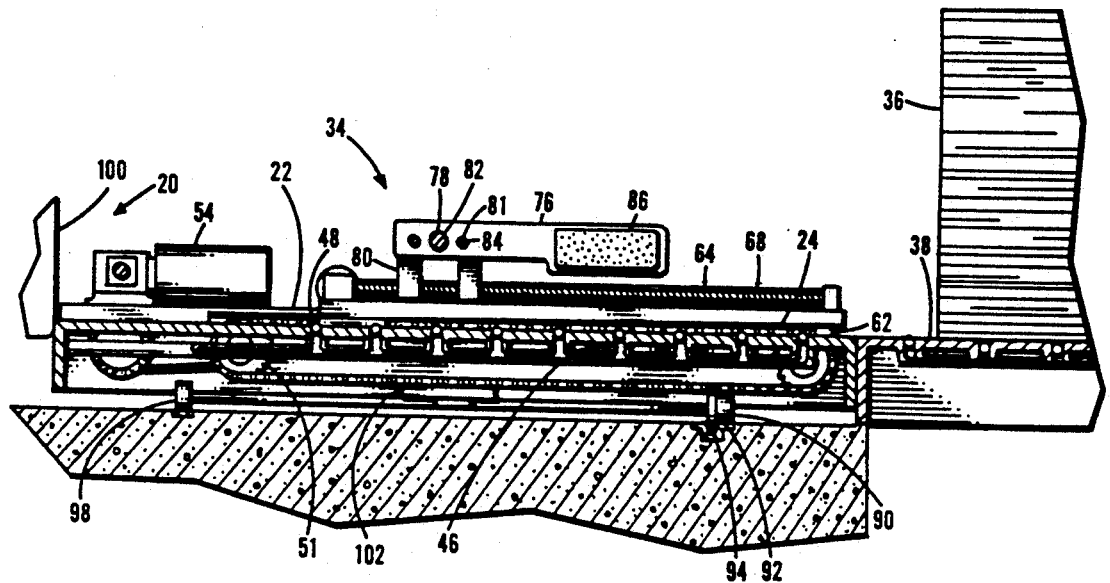
FIG. 5 is a cross-sectional view of the apparatus of FIG. 3 taken along section line 5—5 of FIG. 4.

As shown in FIGS. 3, 4 and 5, the cart 22 is provided with a means for automatically loading a paper stack 36 onto the surface of the air deck 24 and for subsequently unloading the paper stack 36. In the preferred embodiment, this means comprises an extendable member which takes the form of a gripper assembly 34 best shown in FIGS. 4 and 5. Two sets of double sprockets 50 are rotatably mounted to the frame 40 on each side of the air deck 24. The driven sprockets 51 on each side of the deck 24 are mechanically linked and driven in unison by an electric motor 54. The driven sprockets 51 and idler sprockets 50 on each side of the deck 24 are connected by a double drive chain 56. A gripper assembly side member 58 is attached to each double drive chain 56 by a chain attachment link 60 located at the rear of the side member. A low friction slider 62 is located at the front of each side member 58 and is preferably constructed of nylon or similar material.

It should be noted that a pair of single sprockets with a single chain may also be employed for advancing the gripper assembly. Furthermore, other conventional drive means such as a cable-drive, a pneumatic or hydraulic actuator, or other mechanical linkage may be alternatively employed.

The two side members 58 comprise a gripper assembly subcarriage 59 which is moveable from the rear to the front of the air deck 24 in a reciprocating fashion. A drive screw 64 is mounted to rotate above each side member 58 and is connected to an electric motor 66. The drive screw 64 on each side member 58 may be driven by separate electric motors electronically controlled to run in synchronization as shown or a single electric motor may be mechanically linked as by a chain drive to both drive screws. A linear bearing track 68 is mounted parallel to the drive screw above each side member 58.

A gripper carriage 70 is mounted on the two linear bearing tracks 68 with bearings 72 in each carriage ear 80 which engage the linear bearing tracks 68. The gripper carriage 70 is threadedly engaged at the mountings 74 in each carriage ear 80 to the screws 64. Thus when the screws 64 are rotated in unison, the carriage 70 will advance or retract along the side members 58 depending on the direction of rotation of the electric motor 66.

Two opposed gripper arms 76 are positionably mounted to the gripper carriage 70. A single rotatable screw 78 composed of a left-hand thread and a right-hand thread joined at the center extends between the upright carriage ears 80. Two linear bearing ways 81 extend between the ears 80, one on each side of the screw 78. Each gripper arm has a threaded mounting 82 which engages with the screw 78. Two bearings 84 on each gripper arm 76 engage with the linear bearing ways 81. The gripper arms 76 extend forwardly of the gripper carriage 70 and have resilient foam pads 86 which face each other and which are adapted to engage against the upright sides of a paper stack 36. The gripper arm drive screw 78 is rotated by an electric motor 88 to bring the gripper arms closer or further apart. This mechanism allows the gripper assembly to accommodate paper stacks from 12 to 68 inches wide. For particular applications, of course, the gripper assembly 34 may be modified to accommodate paper of greater or lesser dimensions.

The cart 22 is provided with a proximity sensor 116 mounted flush with the surface 44 of the air deck 24 to detect the rear of the gripper assembly 34 and halt the extension of the gripper assembly 34 when the chain attachment links 60 have reached their forwardmost travel position.

As shown in FIG. 5, two flanged wheels 90 are rotatably mounted to the frame 40 towards the front of the cart 22 beneath the air deck 24. Each wheel has a bearing surface 92 which engages against the horizontal surface of the track 26 and a flange 94 which engages in a slot 96 formed in the track 26. The flanges resist reactive forces on the cart 22 during loading and unloading of paper stacks. Two rear wheels 98 are mounted to the frame 40 towards the rear of the cart 22 beneath the air deck 24. The rear wheels bear directly on the track 28 and do not have flanges. It should be noted that the cart 22, because its wheels 90, 98 rotate about fixed axes, is capable of moving only in a side-to-side manner. This configuration is desirable when it is desired that the cart move only along a rectilinear path as in the arrangement of machinery illustrated in FIGS. 1 and 2. Should it be necessary to serve machinery located along a curved path with the same cart the cart 22 may be provided with a set of wheels capable of pivoting about a vertical axis.

An electronic controller 100 is mounted to the rear of the cart 22 and the electric motors 54, 66, 88 are electrically connected to the controller 100 such that the position of a paper stack 36 may be controlled as desired. The controller 100 also controls an electric drive motor 102 which is connected to the wheels 98 to move the cart 22 along the tracks 26, 28. For rectilinear motion of the cart 22, a flexible cable race 104 is provided which surrounds and protects the various electrical cables and compressed air lines which extend between the cart 22 and external supplies and other controlling equipment. Alternatively, the cables may be festooned off overhead supports or controlled in other such conventional manner.

Typically a paper stack 36 will be brought to the jogger/aerator 30 loaded on a pallet and supported by the tines of a forklift truck or pallet jack. The palletized paper stack 36 is loaded on to the jogger/aerator air deck 38 from the loading side 106. Once loaded, the forklift is withdrawn and the jogger/aerator is rotated 90°. At this point the pallet may be removed from the stack 36. After jogging and aerating the jogger/aerator 30 returns to discharge position with the jogged and aerated paper stack 36 supported on the now horizontal air deck 38. During the jogging and aerating the cart 22 is located out of contact with the jogger aerator 30, for example at the staging area 108 shown schematically in FIG. 2. Once the aerator air deck 38 is fully horizontal the cart 22 is drawn up alongside the jogger/aerator 30. The position of the cart 22 with respect to the jogger/aerator air deck 38 is determined by the controller 100 depending on the width of the paper stack 36 carried by the jogger/aerator 30. The paper stack, regardless of width, will always be jogged against the alignment plate 110. Thus, to center the paper stack 36 on the cart 22, the cart will be positioned differently depending on the width of the paper stack.

The position of the cart 22 with respect to the jogger/aerator air deck 38 may be preprogrammed into the controller for each size of paper, allowing the proper position to be determined by the controller with the paper size being entered manually by the human operator.

Preferably, the system 20 is outfitted with a photoelectric sensor 118 located on the leading edge of the cart 22 as the cart returns to a position alongside the jogger/aerator 30 after unloading a paper stack at a sheet-feeding unit. The photoelectric sensor 118 has a photodetector which detects the reflected signal from a photoemitter. The gain of the photodetector is adjusted such that only light reflected from the surface of a paper stack loaded in the jogger/aerator will be detected as a positive signal. The sensor 118 thus detects the passage of the cart 22 past the initial edge of the paper stack 36. The proximity of the paper stack is detected due to the increase in reflected signal strength due to the close proximity of the stack to the sensor 118 as compared to the back of the jogger/aerator. A clock within the controller counts the time between the sensor's initial detection of the positive signal to the time of signal loss— that is the time at which the photoelectric sensor is no longer directed at the paper stack. By multiplying the time spent in passing the stack by the fixed rate of travel of the cart 22 the controller 100 determines the width of the paper stack. Using this information the controller then calculates the correct final position of the cart to center the stack on the cart and instructs the cart to continue in motion until the desired position is reached. In this way the cart will automatically be centered with respect to the paper stack 36 regardless of paper size. The cart 22 with centered paper stack may then be positioned alongside any feeder unit with the cart always in the same position, eliminating the need for elaborate detectors at the feeder units.

The cart 22 may be halted at a feeder unit by appropriate limit switches or by controller programming or each feeder unit may be provided with a photoemitter which is in a position to be detected by the photoelectric sensor 118, with appropriate programming such that the controller 100 halts the cart 22 upon detection of the light emitted by the feeder unit photoemitter. Thus, if it is desired to send the loaded cart 22 to a particular feeder unit the photoemitters on all the feeder units except for the desired destination are turned off so that the cart will pass by those feeder units and halt only at the desired destination.

In the preferred embodiment, the cart 22 is positionable alongside the air decks 38, 112 of the jogger/aerator or printer such that the two air decks are substantially horizontal and coplanar. In many applications, the orientation of the cart 22 will be such that the front-to-back direction of the carts is in-line with the jogger/aerator or the converting equipment. However, it should be noted that where the air deck of a particular converting apparatus is accessible to loading from some other side, such an approach to loading may be employed.

Figure 6:
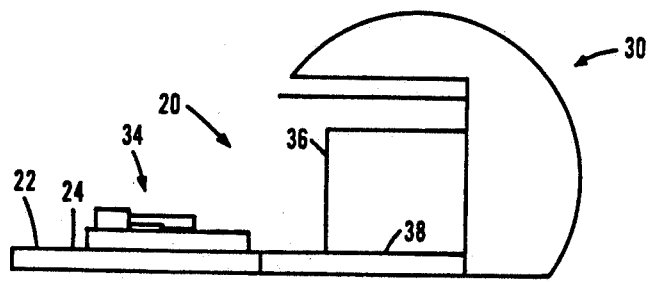
FIG. 6 is a side elevational view of the cart of FIG. 1 aligned with the jogger/aerator with the traveling gripper assembly in a retracted position.
Figure 7:
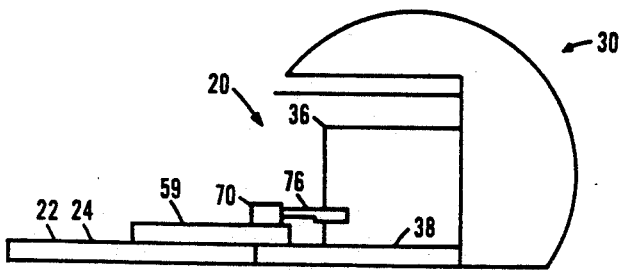
FIG. 7 is a side elevational view of the apparatus of FIG. 6 with the traveling gripper arms extended into engagement with a stack of paper.

Once the cart 22 is in position as shown in FIG. 6, the gripper assembly 34 is advanced by the drive chains 56 such that the side members 58 extend onto the air deck 38 of the jogger/aerator 30 as shown in FIG. 7. The gripper carriage 70 is fully extended forward along the side members 58 with the gripper arms 76 spaced apart a distance greater than the width of the paper stack 36. The side members 58 will be advanced a sufficient distance onto the jogger/aerator air deck 38 to position the pads 86 approximately within the first third of the paper stack 36 depth. Once in position, the screw drive 78 is activated to cause the gripper arms 76 to move towards one another and to engage with the sides of the paper stack 36. A compressive load of approximately 30 to 200 pounds is sufficient to grip the stack 36. A sensor placed in line with the electric motor will detect the current draw increase as resistance to closing of the gripper arms increases and will halt the drive screws 78 at the appropriate load level.

Figure 8:
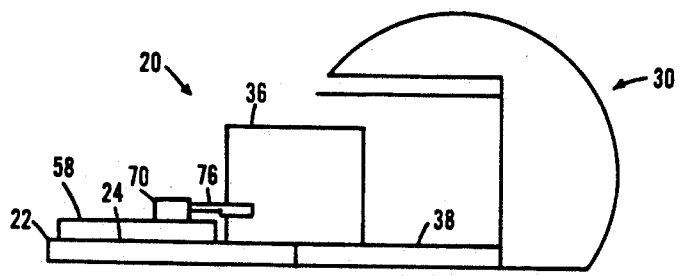
FIG. 8 is a side elevational view of the apparatus of FIG. 7 with the gripped stack partially retracted onto the cart.
Figure 9:
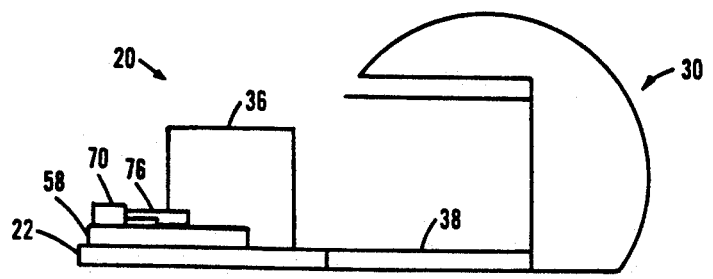
FIG. 9 is a side elevational view of the apparatus of FIG. 8 with the paper stack fully loaded on the cart.

The paper stack 36, securely gripped by the gripper arm 76 may, when the air decks 38, 24 of the jogger aerator and the cart 22 are activated, be withdrawn onto the cart 22 as shown in FIG. 8. The side members 58 are drawn back onto the cart 22 by the drive chains 56 and, if necessary, the gripper carriage 70 is withdrawn between the side members 58 to bring the paper stack 36 fully onto the air deck 24 as shown in FIG. 9.

The loaded cart 22 is then moved along the tracks 26, 28 to the desired sheet feeding machine, for example the sheet feeding printer 32 shown in FIG. 1. Because the paper stack 36 is now centered on the air deck 24 of the cart 22 the cart 22 will stop in the same position with respect to the sheet feeding printing press 32 regardless of the width of the paper stack 36.

Once in position alongside the printing press 32 the paper stack 36 may be unloaded by extending the gripper assembly 34 and gripper arms 76 onto the printer air deck 112 and operating the drive screws 78 to release the grip of the gripper arms 76 from the paper stack 36 once it is in position within the press 32. Preferably a limit switch 114 is provided at the rear of the printing press 32 to determine when the paper stack 36 is properly positioned. Once positioned, the disengaged gripper arms 76 and gripper assembly 34 may be withdrawn from the printing press 32 and the cart may be returned to the staging area 108 or the jogger/aerator 30 to receive the next load.

Figure 10:
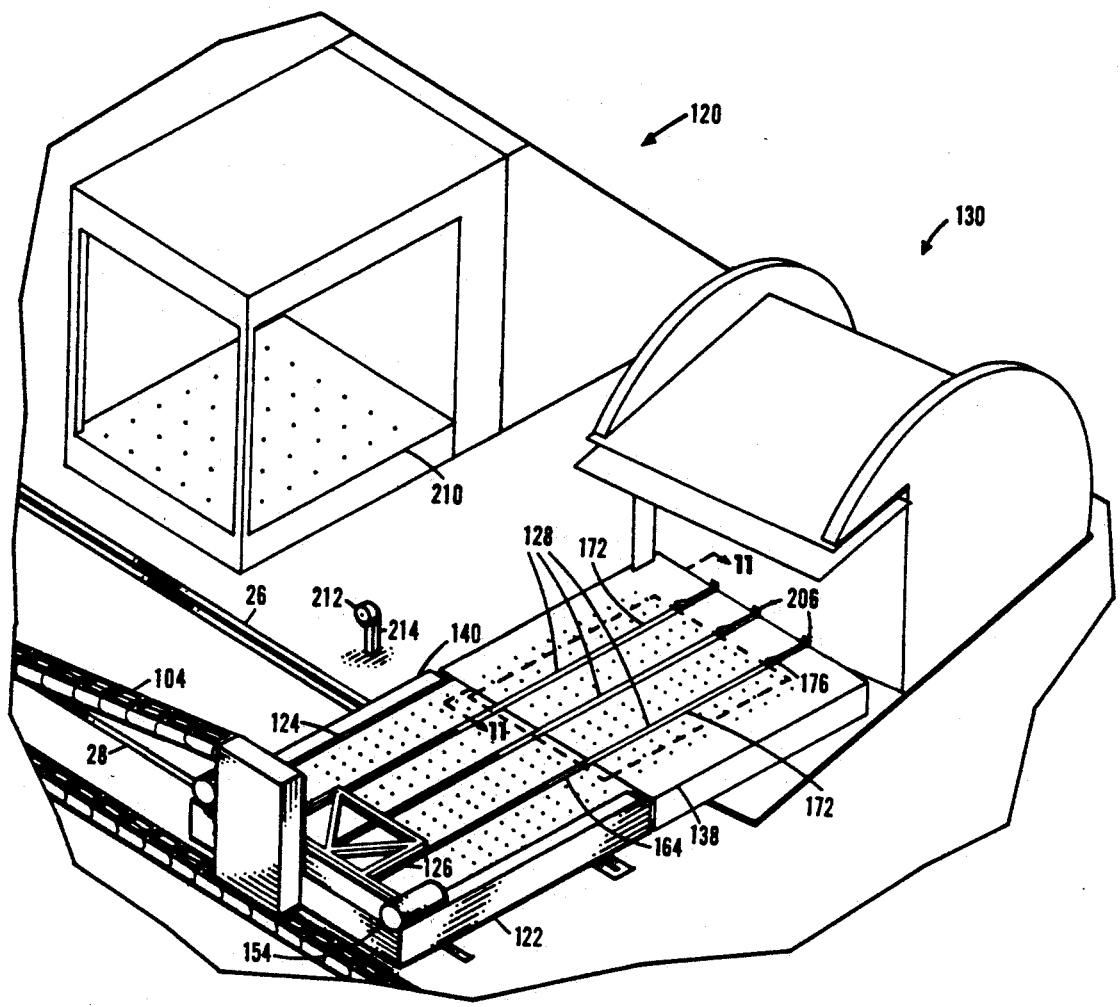
FIG. 10 is an isometric view of an alternative embodiment of the paper transport system of this invention having a mechanical pusher arm and retractible swords with projecting dogs.
Figure 11:
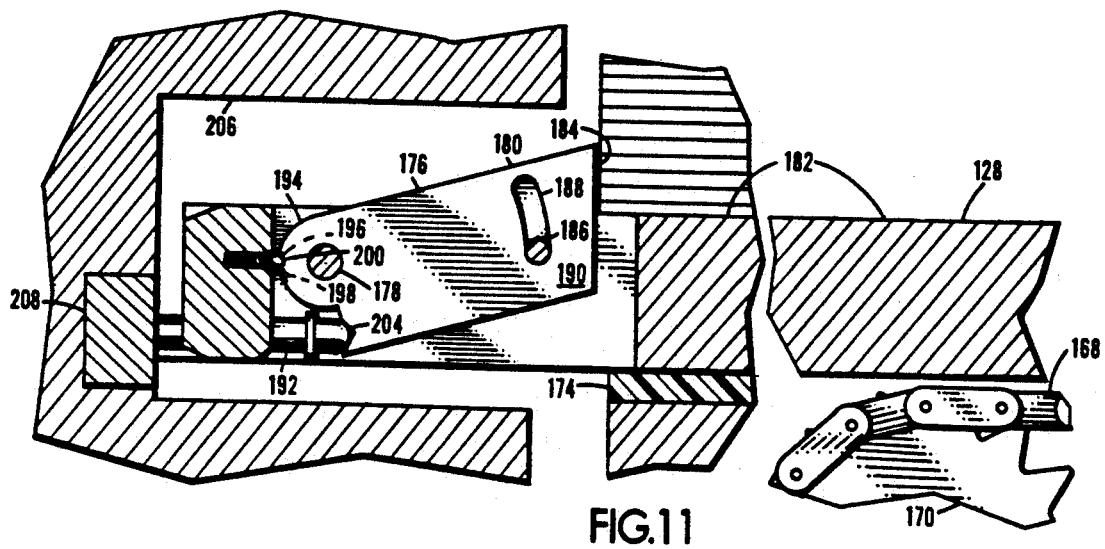
FIG. 11 is a fragmentary cross-sectional view of the apparatus of FIG. 10 taken along section line 11—11 of FIG. 10.

An alternative embodiment of the self-loading air deck paper transport system of this invention is shown in FIGS. 10 and 11. The paper transport system 120 has a cart 122 which travels in the tracks 26, 28 and which has a frame 140 which supports an air deck 124. In place of the gripper assembly of the cart 22, the cart 122 has a means for loading and unloading a paper stack 36 from the air deck 124 which comprises an extendable member which is a pusher arm 126 and three extendable metal swords 128. The pusher arm 126 is a rigid metal frame which is connected by chain attachment links to two double drive chains (not shown) located on either side of the air deck 124 and driven by double drive sprockets around double idler sprockets. An electric motor 154 drives the drive sprockets 154 in unison to advance the pusher arm 126 along the surface of the air deck 124 and onto the air deck 138 of the jogger/aerator 130. Although three swords are shown, a greater or lesser number may be employed depending on the particular load requirements of the air deck.

Each sword 128 is a rectangular steel bar which runs in a linear channel 164 in the air deck 124. Each sword 128 is connected by an attachment link at its rear to a drive chain 168 which is driven on sprockets 170. The air deck 138 of the jogger/aerator 130 is provided with channels 172 which correspond to the channels 164 in the cart air deck 124. The jogger/aerator channels 172 are slightly wider than the swords 128 and have a nylon slider surface 174 mounted at the bottom of each channel 172.

Each sword 128 has a two-position dog 176 located at its forward end. As shown in FIG. 11, each dog 176 is pivotally mounted about a pin 178 to be rotatable between a first position in which the dog top surface 180 is substantially coplanar with the sword top surface 182 and a second elevated position in which the dog engaging surface 184 is substantially perpendicular to the sword top surface 182. Pins 186 extend inwardly from the sword 128 and engage with arcuate slots 188 in the dog sides 190 closely spaced from the dog engaging surface 184.

An activation pin 192 is slideably mounted to the sword 128 to extend frontwardly from the sword when the dog 176 is in its lowered position. A semi-cylindrical surface 194 is located at the rear of the dog and is coaxial with the pin 178. Two conical detents 196, 198 are drilled in the semi-cylindrical surface 194. An upper detent 196 engages with a spring-loaded ball 200 when the dog is in its up position and a lower detent 198 is spaced to one side of the upper detent 196 and engages with a spring-loaded ball when the dog 176 is in its lowered position. Hence, when the activation pin 192 is depressed it engages against a groove 204 in the dog 176 beneath the semi-cylindrical surface depressing the down spring-loaded ball and rotating the dog 176 into its up position where the up spring-loaded ball 200 engages with the upper detent 196. A cutaway 206 to receive each forward end and dog of each sword 128 is provided in the jogger/aerator 130 behind the jogger-aerator air deck 138 which is backed with a resilient backing, preferably a rubber block 208 which effectively engages against the activation pin 192 when a sword 128 is driven by the sword drive chain 168 through the aerator jogger air deck channel 172.

A paper stack 36 is unloaded from the jogger/aerator 130 by the paper transport system 120 by first aligning the air deck 124 on the movable cart 122 such that the channels 164 in the cart air deck 124 are aligned with the channels 172 in the jogger/aerator air deck 138. The sword drive chains 168 are then driven to advance the swords 128 into the channels 172 of the jogger/aerator air deck 138. The sword dogs 176 are in their lowered position, or if in a raised position, are depressed by the weight of the paper stack 36. The swords 128 are passed beneath the paper stack and into the cutaways 206 behind the jogger/aerator air deck 138. At their furthest extension, the swords 128 engage the rubber blocks 208 in the cutaways 206, pressing the activation pins 192 rearward to bring the dogs 176 into their elevated position. With the air flow to the air decks 124, 138 activated, the swords 128 with elevated dogs 176 are withdrawn. The engaging surfaces 184 of the dogs 176 engage against the paper stack 36 which is supported in low friction engagement with the air deck surfaces. The swords then retract fully into the cart 122 air deck 124 to load the paper stack fully onto the cart 122.

The loaded cart 122 may then be advanced along the tracks 26, 28 to a printing press 32 outfitted with an air deck 210. A roller 212 is rotatably mounted to a member 214 to be in the path of the cart 122 such that the elevated dogs 176 will be depressed by the roller 212 as the cart moves beneath the roller 212. When the cart is positioned alongside the printing press air deck 210 the sprocket drive motor 154 is activated to drive the double drive chains of the cart 122 to advance the pusher arm 126 into engagement with the loaded paper stack 36 so as to push the paper stack over the air decks 124, 210 and position the paper stack as desired on the printing press air deck 210.

Figure 2:
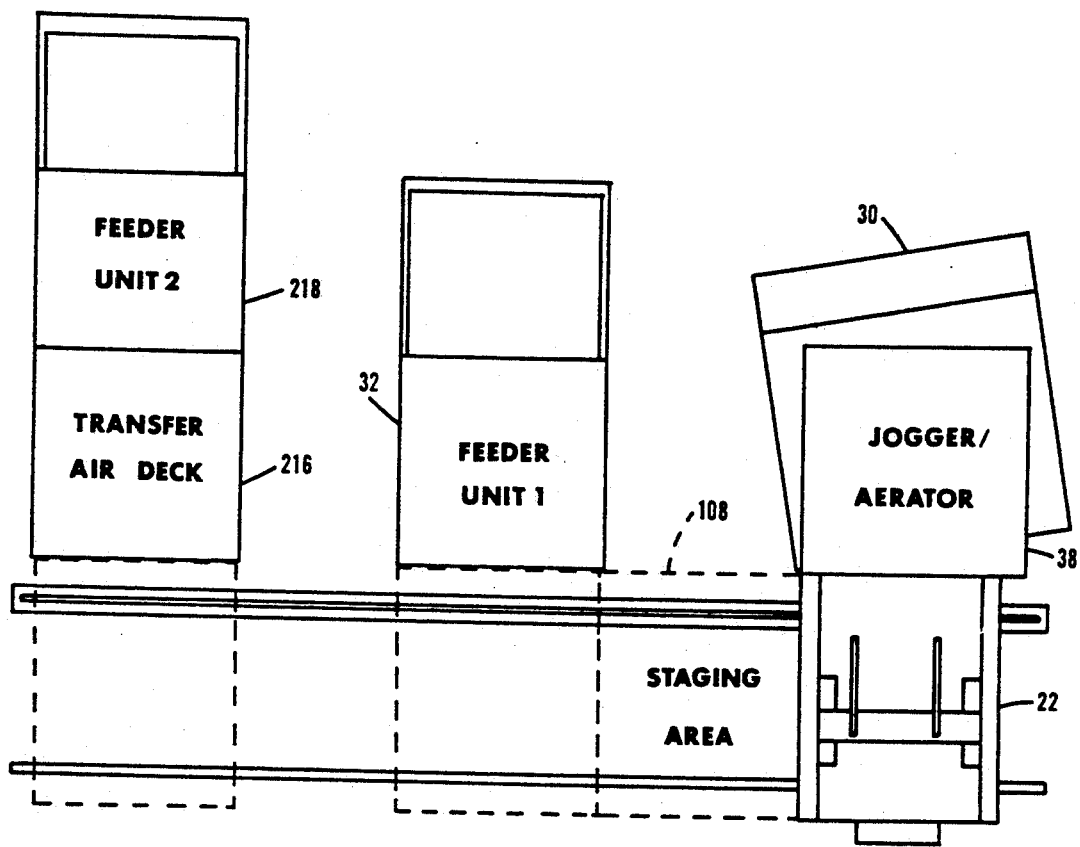
FIG. 2 is a schematic view of an installation of the cart of FIG. 1 in conjunction with multiple sheet feeding apparatus.
Figure 12:
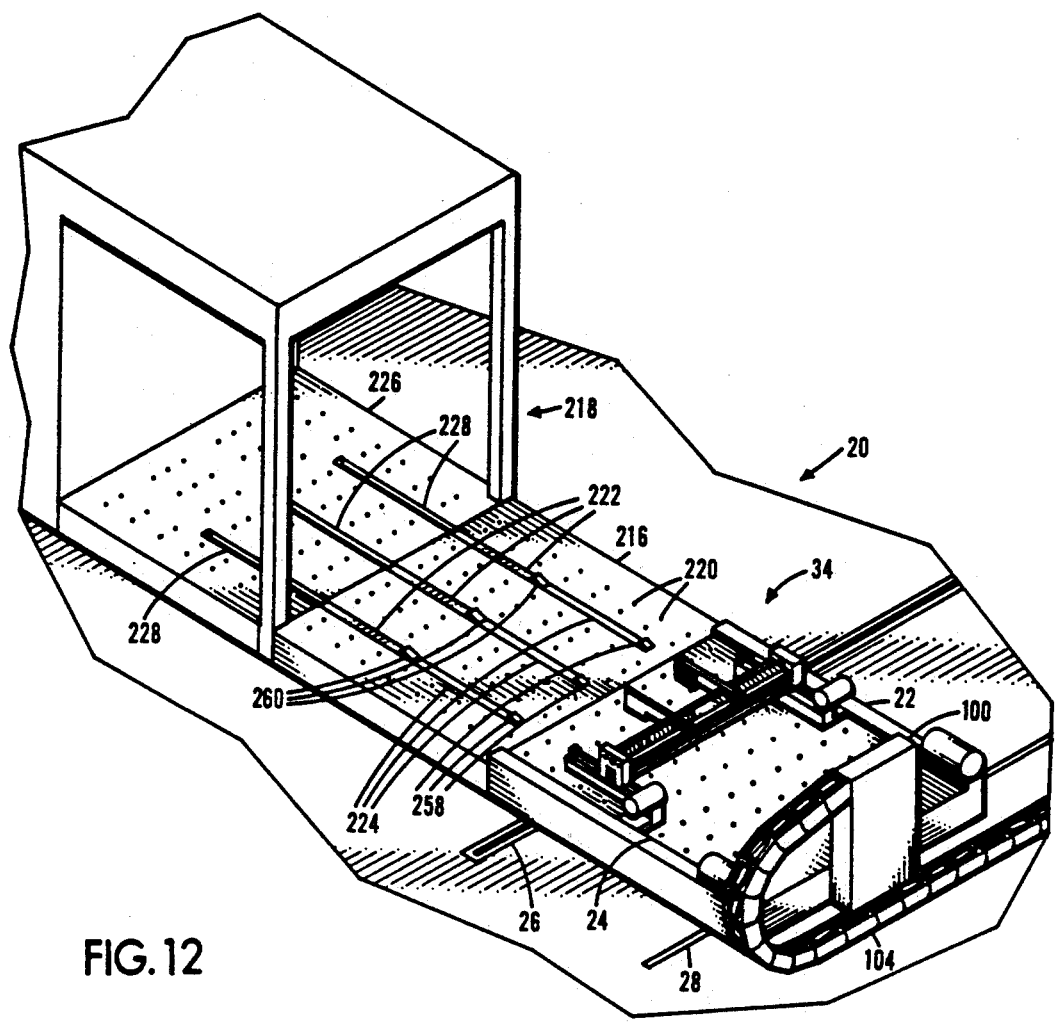
FIG. 12 is an isometric view of the cart of FIG. 1 aligned with a transfer air deck servicing a sheet-feeding apparatus.
Figure 13:
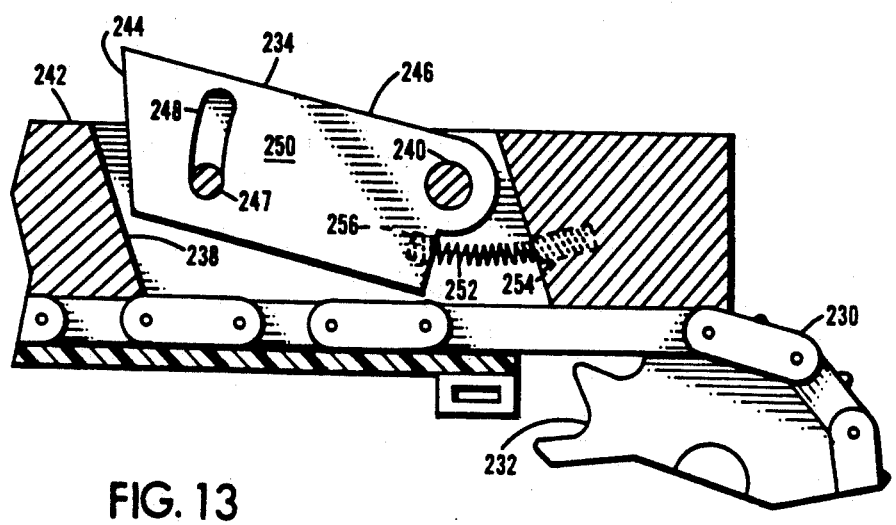
FIG. 13 is a fragmentary cross-sectional view of an extendable sword with spring-loaded dog of the transfer air deck of FIG. 12.

As shown in FIG. 2, the paper transport system 20 may be used with a Plurality of equipment having sheet feeder units. Although two feeder units have been illustrated in FIG. 2, a single cart 22 with appropriate track may supply three or more feeder units with paper stacks. Thus, by utilizing the paper transport system 20 of this invention a single jogger/aerator may be employed to rapidly supply a number of printing presses, die cutters, embossers, laminators, or other sheet feeding equipment. To avoid idle time of a particular sheet feeding unit a transfer air deck 216, as shown in FIGS. 2, 11 and 12, may be positioned alongside the path of the paper transport cart 20 and adjacent to and in-line with a sheet feeding apparatus (feeder unit 2 in FIG. 2). The transfer deck 216 permits a paper stack 36 to be unloaded by the cart 22 onto the transfer deck 216 while a first paper stack is still loaded into the feeder unit 218 itself. The transfer air deck 216 permits the feeder unit 218 to be immediately resupplied upon exhaustion of its paper supply.

The transfer air deck 216 is a fixed air deck having a plurality of apertures 220 connected by a manifold to a supply of compressed air to permit the creation of an air cushion above the surface of the air deck. Three channels 222 extend beneath the surface of the air deck 216 and rectangular cross-section steel bars or swords 224 are located within each channel 222. The feeder unit 218 has an air deck 226 which has channels 228 which correspond to the channels 222 in the transfer air deck 216. The swords 224 are connected to drive chains 230 which are driven by drive sprockets 232 in unison to advance and retract the swords 224 into and out of the feeder air deck 226.

The length of travel required of the swords 224 is reduced by providing each sword with two spring-loaded dogs 234. Each dog is located within a cavity 238 within the swords 224 and is pivotally mounted on a pin 240 to allow movement between a first position in which the dog 234 extends above the surface 242 of the sword 224 and presents an engaging surface 244 which is substantially perpendicular to the sword surface 242 for engaging against a paper stack 36, and a second position in which the dog is depressed by the weight of a paper stack load such that the top surface 246 of the dog 234 is coplanar with the top surface 242 of the sword. The dogs are guided in their movement by pins 247 which extend from the sword 224 part way into the cavity 238 and engage with arcuate slots 248 on the sides 250 of the dog 234. An arcuate spring 252 extends from a blind hole 254 in the sword 224 into a blind hole 256 in the dog 234 beneath the pin 240. The spring 252 retains the dog 234 in its elevated position in the absence of a downwardly acting load supplied by a paper stack.

To load the feeder unit 218 with the transfer air deck 216 the cart 22 is positioned alongside the transfer air deck 216 by the controller 100 and the gripper assembly 34 is activated as described above to unload a paper stack 36 from the air deck 24 of the cart 22 onto the transfer air deck 216. As the paper stack 36 advances onto the transfer air deck 216 first the rear set 258 of dogs 234 is depressed by the moving paper stack 36. As the stack 36 advances onto the transfer air deck the front set 260 of dogs 234 is also depressed. When the paper stack 36 has been advanced beyond the rear set 258 of dogs, the rear set 258 pops into its elevated position and the gripper assembly 34 is withdrawn onto the cart 22 and the cart is returned to the jogger/aerator 30 to accept a new load.

With the paper stack 36 positioned on the transfer air deck 216 an operator or, preferably, an electronic controller (not shown) will activate the drive sprockets 232 to drive the drive chains connected to the swords 224 to advance the paper stack 36 into the feeder unit 218. As the swords 224 are advanced the engaging surfaces 244 of the rear set 258 of dogs 234 engage against the paper stack 36 which, because of the air flow through the air decks 216 and 226 is in low friction engagement with the air deck surfaces, and the paper stack 36 is moved into the feeder unit 218. When the paper stack 36 has been advanced approximately one-half way into the feeder unit 218 the swords 224 are withdrawn until the front set 260 of dogs 234 is retracted from under the paper stack 36 to allow the engaging surfaces 244 of the dogs 234 of the front set 260 to come into an elevated position for engagement with the stack. The swords 224 are then again advanced into the feeder unit 218 pushing the paper stack 36 into its final position on the feeder unit air deck 226.

Once the first paper stack 36 has been loaded onto the feeder unit air deck 226 by the transfer air deck 216 a second paper stack may be immediately placed by the cart 22 onto the transfer air deck 216 as described above. This second stack will then be in position for immediate reloading upon the depletion of a first stack within the feeder unit 218.

The paper transport system 20 of this invention advantageously eliminates the need for pallets in moving stacks of paper between a jogger/aerator and other converting equipment. This elimination of pallets also eliminates the need for hand-operated fork-lift carts or trucks with the inherent risks and potential damage to paper which such vehicles carry with them. Paper loads need never be lifted from a given plane and are moved with great stability and delicacy throughout the processing steps. Furthermore, any need for an operator to physically lift, shift, or turn a paper stack is eliminated. Also eliminated is the physical strain related to such activities. Not only are the forklift and pallet capital investments reduced to the extent the system 20 is employed, the time spent in removing pallets from stacks and from converting equipment between loads is also saved for productive operations.

It should be noted that although the paper transport system 20 has been illustrated as being controlled by an electronic controller, it may be desirable in certain installations to provide direct control over the movement of the cart, the gripper assembly, and the swords by means of human activated switches. Thus, depending on the needs of the installation, the system 20 may be operated entirely manually—even including a cart which moves on tracks by being pushed by a human operator—or the paper transport system may be completely automated. For example, as a load of paper is placed in the jogger/aerator a code may be entered into the controller of the system 20 to instruct the cart as to which feeder unit or transfer air deck a particular load is to be conveyed to.

It should also be noted that the motion control of the cart between the jogger/aerator and the feeder units may be achieved by any conventional means, for example by photo-electric eye detectors, mechanical limit switches, dead reckoning navigation systems, or other positioning systems.

It should further be noted that in particular installations it may be desirable to substitute a self-controlled multi-directional vehicle for the cart disclosed above. Such a vehicle is a conventional means of moving a load from one position to another without human intervention and without the need for tracks.

For purposes of safety the installed paper transport system 20 should be surrounded by fences or optical beam detectors which would automatically shut down any moving equipment upon the entrance of a human into the path of the machinery.

It should be further noted that although the paper transport system has been disclosed exclusively as operating between a jogger/aerator and sheet-feeding converting equipment, in some installations the jogger/aerator may be replaced with a simple load turner or even an output feed of a printing press or other converting equipment. In general, the paper transport system may be utilized in installations wherever it is necessary to repeatedly convey a stack of paper from one air deck to another. Thus, the system could carry printed labels from a sheet printer to a laminating machine, an embosser, or a die cutter, depending on what type of converting machinery is placed along the tracks of the system.

A separate or integrated paper transport system may also be utilized to bring stacks of paper directly from the sheeter to the jogger/aerator or, in cases where jogging and aerating are not required prior to running on the converting equipment, the transport system may extend directly from the sheeter to the converting equipment. Another use would be from the outfeed of one piece of converting equipment to the infeed of another, for example, when it is desired to sequentially print, die-cut, and laminate a stack on separate pieces of equipment. The stacks may be placed on a looped system. Such a loop might connect the output platforms of each converting equipment with the in-feed side of the jogger aerator, or be formed as a continuous loop which would allow the jogger/aerator to be bypassed and the sheets to go directly from the outfeed of one piece of equipment to the in-feed of another.

It is understood that the invention is not confined to the particular construction and arrangement of parts herein illustrated and described, but embraces such modified forms thereof as come within the scope of the following claims.

We claim:

1. An apparatus for the transport of a stack of sheet material from a first air deck to a second air deck, comprising:
   a) a cart having a frame;
   b) a substantially horizontal, planar cart air deck, having a plurality of apertures therein for the introduction of air beneath a stack support on the deck;
   c) a plurality of rotatable wheels mounted to the frame beneath the deck; and
   d) an extendable member connected to the cart and extendable from the cart to engage a stack of sheet material located on the first air deck, and the member being retractable to load the stack onto the cart air deck, wherein the extendable member comprises a carriage mounted to the cart and movable from the rear of the cart to the front of the cart; and two opposed gripper arms connected to the carriage and extending towards the front of the cart, the gripper arms being movable towards and away from each other to selectively engage with and grip the sides of a stack during the loading and unloading of the cart and to release the stack when it is in a desired location.

2. An apparatus for the transport of a stack of sheet material from a first air deck to a second air deck, comprising:
   a) a cart having a frame;
   b) a substantially horizontal, planar cart air deck, having a plurality of apertures therein for the introduction of air beneath a stack support on the deck;
   c) a plurality of rotatable wheels mounted to the frame beneath the deck; and
   d) an extendable member connected to the cart and extendable from the cart to engage a stack of sheet material located on the first air deck, and the member being retractable to load the stack onto the cart air deck, wherein the extendable member comprises a carriage mounted to the cart and movable from the rear of the cart to the front of the cart; and two opposed gripper arms connected to the carriage and extending towards the front of the cart, the gripper arms being movable towards and away from each other to selectively engage with and grip the sides of a stack during the loading and unloading of the cart and to release the stack when it is in a desired location;
   e) a subcarriage connected to a drive chain, the drive chain running over a rotatable sprocket mounted to the cart, such that rotation of the sprocket advances or retracts the subcarriage from the front to the rear of the cart, wherein the subcarriage comprises two spaced side members which are slidable on the cart air deck;
   f) a track mounted to each side member; and
   g) linear bearings located on the carriage and mounted on the tracks such that the carriage may be advanced from and retracted within the subcarriage so that a stack engaged by the gripper arms may be withdrawn onto the cart air deck between the side members of the subcarriage.

3. An apparatus for the transport of a stack of sheet material from a first air deck to a second air deck, comprising:
   a) a cart having a frame;
   b) a substantially horizontal, planar cart air deck, having a plurality of apertures therein for the introduction of air beneath a stack support on the deck;
   c) a plurality of rotatable wheels mounted to the frame beneath the deck; and
   d) an extendable member connected to the cart and extendable from the cart to engage a stack of sheet material located on the first air deck, and the member being retractable to load the stack onto the cart air deck;
   e) a sensor mounted to the cart to detect the presence of a stack on the first air deck;
   f) a motor connected in driving relation to at least one of said plurality of rotatable wheels, the motor being adapted to advance the cart at a predetermined rate; and g) an electronic controller electronically connected to the cart wheel drive motor to control the motion of the cart and connected to the sensor, the controller having a clock, such that when the cart is advance past the first air deck having a stack mounted thereon the controller senses the presence of a stack in the path of the sensor for a duration measured by the clock as the cart advances at a known rate, the controller being adapted to calculate the width of the paper stack and halt the motion of the cart when the paper stack is positioned on the first air deck with respect to the cart such that the center of the paper stack is aligned with the center of the cart.

4. An apparatus for the transport of a stack of sheet material from a first air deck to a second air deck, comprising:

a) a cart having a frame;
b) a substantially horizontal, planar cart air deck, having a plurality of apertures therein for the introduction of air beneath a stack support on the deck;
c) a plurality of rotatable wheels mounted to the frame beneath the deck; and
d) an extendable member connected to the cart and extendable from the cart to engage a stack of sheet material located on the first air deck, and the member being retractable to load the stack onto the cart air deck;
e) a transfer air deck aligned with the second air deck and fixed in place;
f) a plurality of rectilinear channels formed by portions of the transfer air deck;
g) a reciprocally extending bar mounted within each transfer air deck channel;
h) channels formed in the second air deck which are aligned with the transfer air deck channels;
i) spring-loaded rear dogs mounted to the end of each bar; and
j) spring-loaded front dogs mounted forward of the rear dogs on each bar, the dogs being depressible under the load of a stack, and the bars being movable to advance a stack placed on the transfer air deck onto the second air deck, such that the rear dogs first engage the stack and move it a portion of the distance onto the second air deck, and then the bars retract until the front dogs are in position to engage the stack, and the front dogs then engage the stack and advance it onto the second air deck.

5. An apparatus for the transport of a stack of sheet material from a first air deck to a second air deck, comprising:

a) a cart having a frame;
b) a substantially horizontal, planar cart air deck, having a plurality of apertures therein for the introduction of air beneath a stack support on the deck;
c) a plurality of rotatable wheels mounted to the frame beneath the deck; and
d) a pusher arm reciprocally mounted above the cart air deck and movable to extend beyond the air deck, the pusher arm being adapted to engage against a stack loaded on the cart air deck and to eject the stack onto the second air deck;
e) portions of the cart air deck defining a plurality of rectilinear channels opening to the front of the cart;
f) a portion of the first air deck defining a plurality of rectilinear channels corresponding to and aligned with each cart air deck channel;
g) an extendable member connected to the cart and extendable from the cart to engage a stack of sheet material located on the first air deck, and the member being retractable to load the stack onto the cart air deck, wherein the extendable member comprises a rectilinear bar positioned in each cart air deck channel and movable between a retracted position entirely within the cart air deck and an extended position which extends into the first air deck channels; and
h) a pop-up dog located on the forward end of each bar, the dog being adapted to pop-up into contact with the front of the stack positioned on the first air deck such that when the bars are retracted into the cart air deck the stack will be loaded onto the cart air deck.

6. An apparatus for conveying a stack of sheet material from a first air deck to a second air deck, comprising:

a) a positionable cart having a horizontal air deck mounted thereon, the air deck having a plurality of apertures for the introduction of pressurized air through the deck to create a cushion of air adapted to support a stack of sheet material loaded on the cart, and the cart being movable between a first position adjacent the first air deck and a second position adjacent the second air deck such that the cart air deck is substantially coplanar with the first and second air decks when the cart is in the first and second positions respectively;
b) means for loading and unloading a stack from the cart, said loading and unloading means being connected to the cart for movement with the cart between the first and second positions such that a paper stack may be unloaded from the first deck and loaded onto the cart, transported to the second air deck, and unloaded onto the second air deck, wherein the means for loading and unloading a stack from the cart comprises a carriage mounted to the cart and movable from the rear of the cart to the front of the cart; and two opposed gripper arms connected to the carriage and extending towards the front of the cart, the gripper arms being movable towards and away from each other to selectively engage with an grip the sides of a stack during the loading and unloading of the cart and to release the stack when it is in a desired location.

7. The apparatus of claim 6 further comprising two drive chains mounted to the cart on rotatable sprockets, one chain on either side of the carriage, wherein the carriage is connected to the drive chains such that rotation of the sprockets selectively advances or retracts the carriage on the cart.

8. The apparatus of claim 6 further comprising:
a) a subcarriage connected to a drive chain, the drive chain running over a rotatable sprocket mounted to the cart, such that rotation of the sprocket advances or retracts the subcarriage from the front to the rear of the cart wherein the subcarriage comprises two spaced side members which are slideable on the cart air deck;
b) a track mounted to each side member; and
c) linear bearings located on the carriage and mounted on the tracks such that the carriage may be advanced from and retracted within the subcarriage so that a stack engaged by the gripper arms may be withdrawn onto the cart air deck between the side members of the subcarriage.

9. An apparatus for conveying a stack of sheet material from a first air deck to a second air deck, comprising:
   a) a positionable cart having a horizontal air deck mounted thereon, the air deck having a plurality of apertures for the introduction of pressurized air through the deck to create a cushion of air adapted to support a stack of sheet material loaded on the cart, and the cart being movable between a first position adjacent the first air deck and a second position adjacent the second air deck such that the cart air deck is substantially coplanar with the first and second air decks when the cart is in the first and second positions respectively;
   b) means for loading and unloading a stack from the cart, said loading and unloading means being connected to the cart for movement with the cart between the first and second positions such that a paper stack may be unloaded from the first deck and loaded onto the cart, transported to the second air deck, and unloaded onto the second air deck;
   c) a transfer air deck aligned with the second air deck and fixed in place;
   d) a plurality of rectilinear channels formed by portions of the transfer air deck;
   e) a reciprocally extending bar mounted within each channel;
   f) channels formed in the second air deck which are aligned with the transfer air deck channels;
   g) spring-loaded rear dogs mounted to the end of each bar; and
   h) spring loaded front dogs mounted forward of the rear dogs on each bar, the dogs being depressible under the load of a stack, and the bars being movable to advance a stack placed on the transfer air deck onto the second air deck, such that the rear dogs first engage the stack and move it a portion of the distance onto the second air deck, and then the bars retract until the front dogs are in position to engage the stack, and the front dogs then engage the stack and advance it onto the second air deck.

10. An apparatus for conveying a stack of sheet material from a first air deck to a second air deck, comprising:
   a) a positionable cart having a horizontal air deck mounted thereon, the air deck having a plurality of apertures for the introduction of pressurized air through the deck to create a cushion of air adapted to support a stack of sheet material loaded on the cart, and the cart being movable between a first position adjacent the first air deck and a second position adjacent the second air deck such that the cart air deck is substantially coplanar with the first and second air decks when the cart is in the first and second positions respectively;
   b) means for loading and unloading a stack from the cart, said loading and unloading means being connected to the cart for movement with the cart between the first and second positions such that a paper stack may be unloaded from the first deck and loaded onto the cart, transported to the second air deck, and unloaded onto the second air deck;
   c) a plurality of rotatable wheels mounted to the cart;
   d) a sensor mounted to the cart to detect the presence of a stack on the first air deck;
   e) a motor connected in driving relation to at least one cart wheel, the motor being adapted to advance the cart at a predetermined rate; and
   f) an electronic controller electronically connected to the cart wheel drive motor to control the motion of the cart and connected to the sensor, the controller having a clock, such that when the cart is advanced past the first air deck having a stack mounted thereon the controller senses the presence of a stack in the path of the sensor for a duration measured by the clock as the cart advances at a known rate, the controller being adapted to calculate the width of the paper stack and halt the motion of the cart when the paper stack is positioned on the first air deck with respect to the cart such that the center of the paper stack is aligned with the center of the cart.

11. An apparatus for conveying a stack of sheet material from a first air deck to a second air deck, comprising:
   a) a positionable cart having a horizontal air deck mounted thereon, the air deck having a plurality of apertures for the introduction of pressurized air through the deck to create a cushion of air adapted to support a stack of sheet material loaded on the cart, and the cart being movable between a first position adjacent the first air deck and a second position adjacent the second air deck such that the cart air deck is substantially coplanar with the first and second air decks when the cart is in the first and second positions respectively; and
   b) means for loading and unloading a stack from the cart, said loading and unloading means being connected to the cart for movement with the cart between the first and second positions such that a paper stack may be unloaded from the first deck and loaded onto the cart, transported to the second air deck, and unloaded onto the second air deck, wherein the means for loading and unloading the cart comprises:
      i) a pusher arm reciprocally mounted above the cart air deck and movable to extend beyond the air deck, the pusher arm being adapted to engage against a stack loaded on the cart air deck and to eject the stack onto the second air deck;
      ii) portions of the cart air deck defining a plurality of rectilinear channels opening to the front of the cart;
      iii) a portion of the first air deck defining a plurality of rectilinear channels corresponding to and aligned with each cart air deck channel;
      iv) a rectilinear bar positioned in each cart air deck channel and movable between a retracted position entirely within the cart air deck and an extended position which extends into the first air deck channels; and
      v) a pop-up dog located on the forward end of each bar, the dog being adapted to pop-up into contact with a frontward side of a stack positioned on the first air deck such that when the bars are retracted into the cart air deck the stack will be loaded onto the cart air deck.

12. An apparatus for conveying a stack of sheet material from a first air deck to a second air deck, comprising:
   a) a positionable cart having a horizontal air deck mounted thereon, the air deck having a plurality of apertures for the introduction of pressurized air through the deck to support a stack of sheet material loaded on the cart, and the cart being movable to position the cart air deck in a first position adjacent to and substantially coplanar with the first air deck and a second position adjacent to and substantially coplanar with the second air deck;

b) a carriage mounted to the cart above the cart air deck and movable from the rear of the cart to the front of the cart; and c) two opposed gripper arms connected to the carriage and extending towards the front of the cart, the gripper arms being movable towards and away from each other to selectively engage with and grip the sides of a stack during the loading and unloading of the cart and to release the stack when it is in a desired location.

13. The apparatus of claim 12 further comprising drive chains mounted to the cart on rotatable sprockets on either side of the cart air deck, wherein the carriage is connected to the drive chains such that rotation of the sprockets selectively advances or retracts the carriage on the cart.

14. The apparatus of claim 12 further comprising:

a) a subcarriage having two slideable side members each connected to a drive chain, each drive chain running over a rotatable sprocket mounted to the cart, such that rotation of the sprockets advances or retracts the subcarriage from the front to the rear of the cart;

b) a track mounted to each side member; and c) linear bearings located on the carriage and mounted on the tracks such that the carriage may be advanced from and retracted within the subcarriage so that a stack engaged by the gripper arms may be withdrawn onto the cart air deck between the side members of the subcarriage.

15. The apparatus of claim 12 further comprising:

a) a plurality of wheels mounted to the cart beneath the air deck;

b) a sensor mounted to the cart to detect the presence of a stack on the first air deck;

c) a motor connected in driving relation to at least one cart wheel, the motor being adapted to advance the cart at a predetermined rate; and d) an electronic controller electronically connected to the cart wheel drive motor to control the motion of the cart and connected to the sensor, the controller having a clock, such that when the cart is advanced past the first air deck having a stack mounted thereon the controller senses the presence of a stack in the path of the sensor for a duration measured by the clock as the cart advances at a known rate, the controller being adapted to calculate the width of the paper stack and halt the motion of the cart when the paper stack is positioned on the first air deck with respect to the cart such that the center of the paper stack is aligned with the center of the cart.

* * * * *